United States Patent
Dharmarajan et al.

(10) Patent No.: US 12,093,133 B2
(45) Date of Patent: Sep. 17, 2024

(54) ON-DEMAND BACKUPS FOR MANAGEMENT COMPONENTS IN SOFTWARE-DEFINED DATA CENTERS

(71) Applicant: VMWARE, INC., Palo Alto, CA (US)

(72) Inventors: Baskar Dharmarajan, Bangalore (IN); Anantha Mohan Raj, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/134,053

(22) Filed: Apr. 13, 2023

(65) Prior Publication Data

US 2024/0256387 A1    Aug. 1, 2024

(30) Foreign Application Priority Data

Jan. 27, 2023   (IN) .............................. 202341005346

(51) Int. Cl.
   *G06F 16/14*    (2019.01)
   *G06F 11/14*    (2006.01)
(52) U.S. Cl.
   CPC ...... *G06F 11/1448* (2013.01); *G06F 11/1458* (2013.01)

(58) Field of Classification Search
   CPC ..................... G06F 11/2448; G06F 11/1458
   See application file for complete search history.

(56) References Cited

U.S. PATENT DOCUMENTS

| | | | |
|---|---|---|---|
| 10,430,293 B1 * | 10/2019 | Skowronski | G06F 11/1458 |
| 11,436,099 B2 * | 9/2022 | Skowronski | G06F 11/1469 |
| 11,436,100 B2 * | 9/2022 | Skowronski | G06F 11/1469 |
| 2020/0026620 A1 * | 1/2020 | Skowronski | G06F 11/1458 |
| 2020/0026621 A1 * | 1/2020 | Skowronski | G06F 11/1448 |

* cited by examiner

*Primary Examiner* — Baoquoc N To
(74) *Attorney, Agent, or Firm* — King Intellectual Asset Management

(57) ABSTRACT

System and method for backing up management components of a software-defined data center (SDDC) managed by a cloud-based service uses backup rules for the SDDC, which are used to configure a backup manager agent in the SDDC. The backup rules are then used by the backup manager agent to determine whether at least one of system logs generated by the management components in the SDDC, which are monitored by the backup manager agent, satisfies the backup rules to initiate a backup operation for at least one of the management components of the SDDC.

20 Claims, 8 Drawing Sheets

Receive backup rules for the SDDC at a backup-restore (BR) cloud service in a public cloud computing environment — 702

Store the backup rules in storage accessible by the BR cloud service — 704

Configure a backup manager agent in the SDDC with the backup rules retrieved from the storage — 706

Monitor system logs generated by the management components of the SDDC by the backup manager agent to determine whether at least one of the system logs satisfies the backup rules. — 708

When at least one of the system logs satisfies the backup rules, initiate a backup operation for at least one of the management components of the SDDC — 710

FIG. 4

```
{
    "backup_rules": {
        "on-demand-backup-policy": {
            "Syslogs": {
                "host [vim.HostSystem:host-*,esxi-
*.vrack.vsphere.local] connection state changed to NO_RESPONSE",
                "Created VM vim.VirtualMachine:vm-* (ds:///vmfs/volumes/*/cp-template-*/cp-
template-*.vmx) on host [vim.HostSystem:host-*,daas-esx*.local] (daas-
esx*.local)",
                "Update VM vim.VirtualMachine:vm-* (ds:///vmfs/volumes/*/cp-template-*/cp-
template-*.vmx) on host [vim.HostSystem:host-*,daas-esx*.local] (daas-
esx*.local)",
            },
            "max_match": Integer,
            "max_match": Integer,
            "force": Boolean,
            "max_backup_per_day": Integer,
            "alertable": Integer,
            "enabled": Boolean
        },
        "default-one-backup-policy": {
            "backup_time_trigrred_policy_cron": "0 30 9 1/1 * ?
*",
            "enabled": Boolean
        },
        "default-two-backup-policy": {
            "backup_time_trigrred_policy_cron": "0 30 9,22 1/1 *
? *",
            "enabled": Boolean
        },
        "retention-policy": {
            "backup_age_in_days": Integer,
            "max_backups": Integer,
            "number_of_backup_per_day": Integer,
        }
    }
}
```

ON-DEMAND BACKUPS FOR MANAGEMENT COMPONENTS IN SOFTWARE-DEFINED DATA CENTERS

RELATED APPLICATIONS

Benefit is claimed under 35 U.S.C. 119(a)-(d) to Foreign Application Serial No. 202341005346 filed in India entitled "ON-DEMAND BACKUPS FOR MANAGEMENT COMPONENTS IN SOFTWARE-DEFINED DATA CENTERS", on Jan. 27, 2023, by VMware, Inc., which is herein incorporated in its entirety by reference for all purposes.

BACKGROUND

Software-defined data centers (SDDCs) may be deployed in any computing environment. As an example, SDDCs may be deployed in a dedicated private cloud environment of a public cloud for an entity or customer via a cloud service provider, where each SDDC may include one or more clusters of host computers. Such dedicated private cloud environments may be managed by a cloud service provider, which uses a public cloud operated by a public cloud provider.

Once an SDDC is deployed in a computing environment, one or more management components of the SDDC may be required to be restored due a variety of reasons, such as one or more failures in the SDDC. Thus, the management components of the SDDC should be backed up periodically so that the management components can be restored to a previous point in time when the management components were operating properly. However, in an SDDC that is managed by a cloud service provider, the SDDC may simply be backed up on a fixed time schedule, which may not be sufficient to restore the SDDC back to a desired point in time.

SUMMARY

System and method for backing up management components of a software-defined data center (SDDC) managed by a cloud-based service uses backup rules for the SDDC, which are used to configure a backup manager agent in the SDDC. The backup rules are then used by the backup manager agent to determine whether at least one of system logs generated by the management components in the SDDC, which are monitored by the backup manager agent, satisfies the backup rules to initiate a backup operation for at least one of the management components of the SDDC.

A computer-implemented method for backing up management components of a software-defined data center (SDDC) managed by a cloud-based service in accordance with an embodiment of the invention comprises receiving backup rules for the SDDC into a backup-restore (BR) cloud service in a public cloud computing environment, storing the backup rules in storage accessible by the BR cloud service, configuring a backup manager agent in the SDDC with the backup rules retrieved from the storage, monitoring system logs generated by the management components of the SDDC by the backup manager agent to determine whether at least one of the system logs satisfies the backup rules, and when at least one of the system logs satisfies the backup rules, initiating a backup operation for at least one of the management components of the SDDC. In some embodiments, the steps of this method are performed when program instructions contained in a computer-readable storage medium are executed by one or more processors.

A system in accordance with an embodiment of the invention comprises memory and at least one processor configured to receive backup rules for the SDDC into a backup-restore (BR) cloud service in a public cloud computing environment, store the backup rules in storage accessible by the BR cloud service, configure a backup manager agent in the SDDC with the backup rules retrieved from the storage, monitor system logs generated by the management components of the SDDC by the backup manager agent to determine whether at least one of the system logs satisfies the backup rules, and when at least one of the system logs satisfies the backup rules, initiate a backup operation for at least one of the management components of the SDDC.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 shows a backup rule schema used in the distributed computing system in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
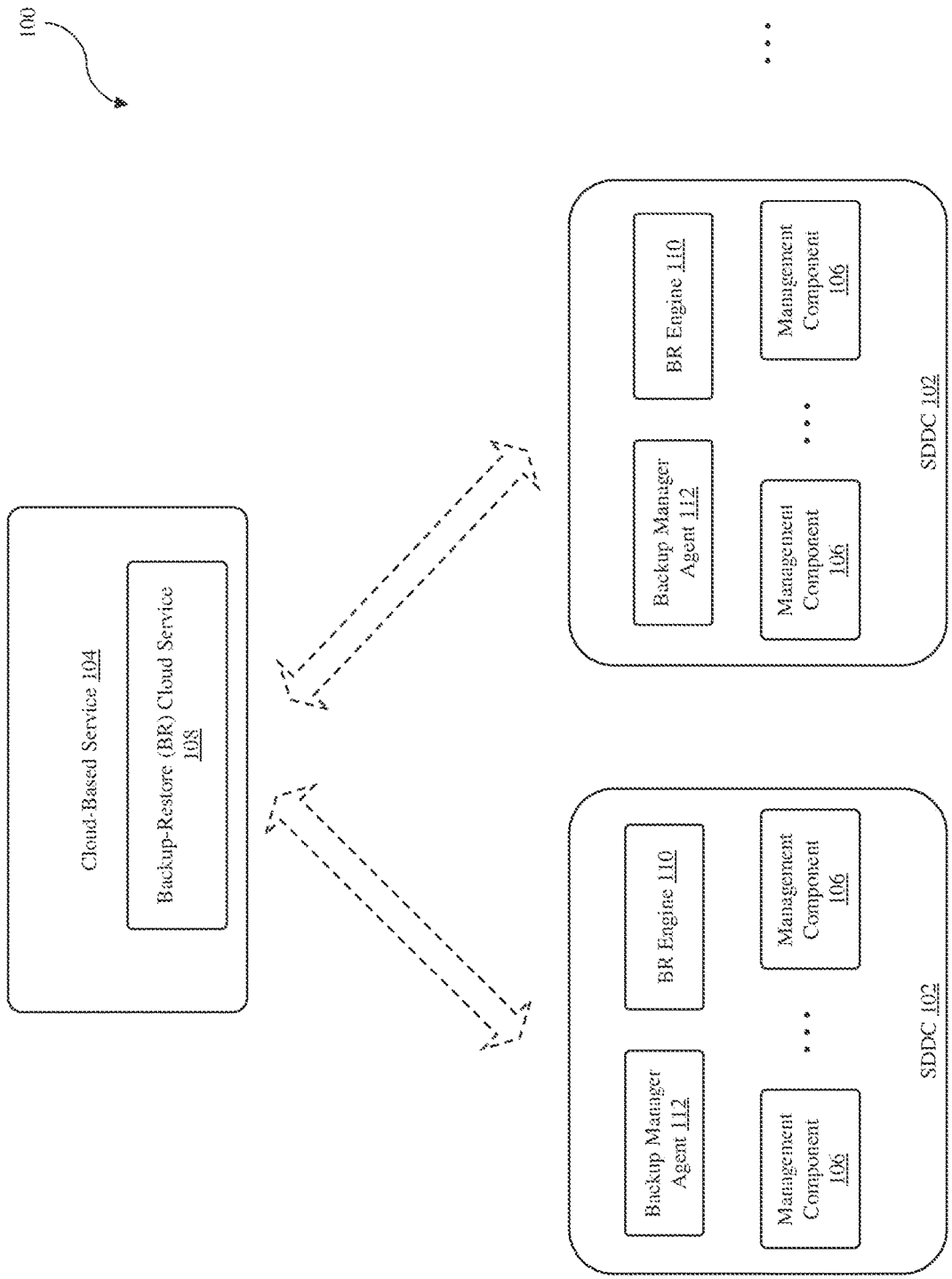
FIG. 1 illustrates a distributed computing system with a cloud-based service having a backup-restore (BR) cloud service and a number of software-defined data centers (SDDCs) in accordance with an embodiment of the invention.

Turning now to FIG. 1, a distributed computing system 100 in accordance with an embodiment of the invention is illustrated. The distributed computing system 100 includes a plurality of software-defined data centers (SDDCs) 102 and a cloud-based service 104. Each SDDC 102 includes a number of management components 106, which should be backed up at different times so that, when there is a problem or failure, one or more of these management components can be restored back to a time when the management components were operating properly. The management components 106 in the SDDCs 102 can be any type of software components that performs management operations with respect to the SDDCs, such as compute, storage and networking management operations in the SDDCs. Examples of the management components 106 in the SDDCs 102 are described below.

The cloud-based service 104 is configured or programmed to access the SDDCs 102 to execute various operations. As an example, the cloud-based service 104 may be configured or programmed to deploy, update, delete and otherwise manage components in the SDDCs 102. The cloud-based service 104 may also be configured or programmed to manage allocation of virtual computing resources to the SDDCs 102. In addition, the cloud-based service 104 is configured or programmed to orchestrate backup and restore operations for the management components 106 in the SDDCs 102, which are managed by the cloud-based service. The orchestration of the backup and restore operations for the SDDCs 102 is performed by a backup-restore (BR) cloud service 108 in the cloud-based service 104. The backup and restore operations may be initiated by the BR cloud service 108 based on a fixed time schedule for the SDDCs 102 or under certain conditions, such as SDDC upgrades. As an example, the BR cloud service 108 may be configured or programmed to initiate a backup operation of the management components of each SDDC every seven (7) days. The backup and restore operations may also be initiated by the BR cloud service 108 in response to user commands, which may be entered into the cloud-based service 104 via a user interface, such as a web user interface. In an embodiment, the cloud-based service 104 may be configured or programmed to be accessible to authorized users via a REST (Representational State Transfer) API (Application Programming Interface) or any other client-server communication protocol so that various operations can be executed at the SDDCs 102. However, the BR cloud service 108 may not be configured or programmed to be able to initiate a backup operation of the management components 106 of a SDDC 102 due to some changes in that SDDC, such as a configuration drift, or addition/deletion of one or more components in the SDDC. As an example, the cloud-based service 104 may be a VMware vCloud Director® service from VMware, Inc., which may be running on VMware cloud (VMC) on Amazon Web Services (AWS).

Backup operations on the management components 106 in each SDDC 102 are executed by a backup-restore (BR) engine 110 running in that SDDC. The BR engine 110 of an SDDC 102 can be triggered to start a backup operation on the management components of that SDDC by the BR cloud service 108 in the cloud-based service 104 based on a user command or a fixed time schedule. However, in accordance with embodiments of the invention, the BR engine 110 in an SDDC 102 can also be triggered to start a backup operation on the management components of that SDDC by a backup manager agent 112 running in the SDDC. As described in more detail below, the backup manager agent 112 of an SDDC 102 uses a list of data-driven backup rules to determine when to trigger the BR engine 110 to start a backup operation on that SDDC, e.g., the management components 106 in the SDDC. The data-driven backup rules may include changes to the inventory of the SDDC, such as addition or removal of host computers or processes, e.g., virtual machines, and changes to configurations of components in the SDDC, e.g., [Created VM vim. VirtualMachine:vm-1005 (ds:///vmfs/volumes/vsan:2c42275ba29f41dd-*b*6697 97e6f6bdbc5/c00cce63-8dfc-26d8-6c47-0a28864b9d37/ Baskar_workload.vmx) on host [vim.HostSystem:host-16, 10.2.32.4] (10.2.32.4)]. The backup manager agent 112 running in each of the SDDCs is further described below.

Each SDDC 102 in the distributed computing system 100 may be running in an on-premise computing environment (sometimes referred to herein as a private cloud computing environment or simply a private cloud), in a public cloud computing environment (or simply a public cloud) or in a hybrid cloud (a combination of private and public clouds). These SDDCs 102 may be owned and operated by different business entities, such as business enterprises.

Figure 2:
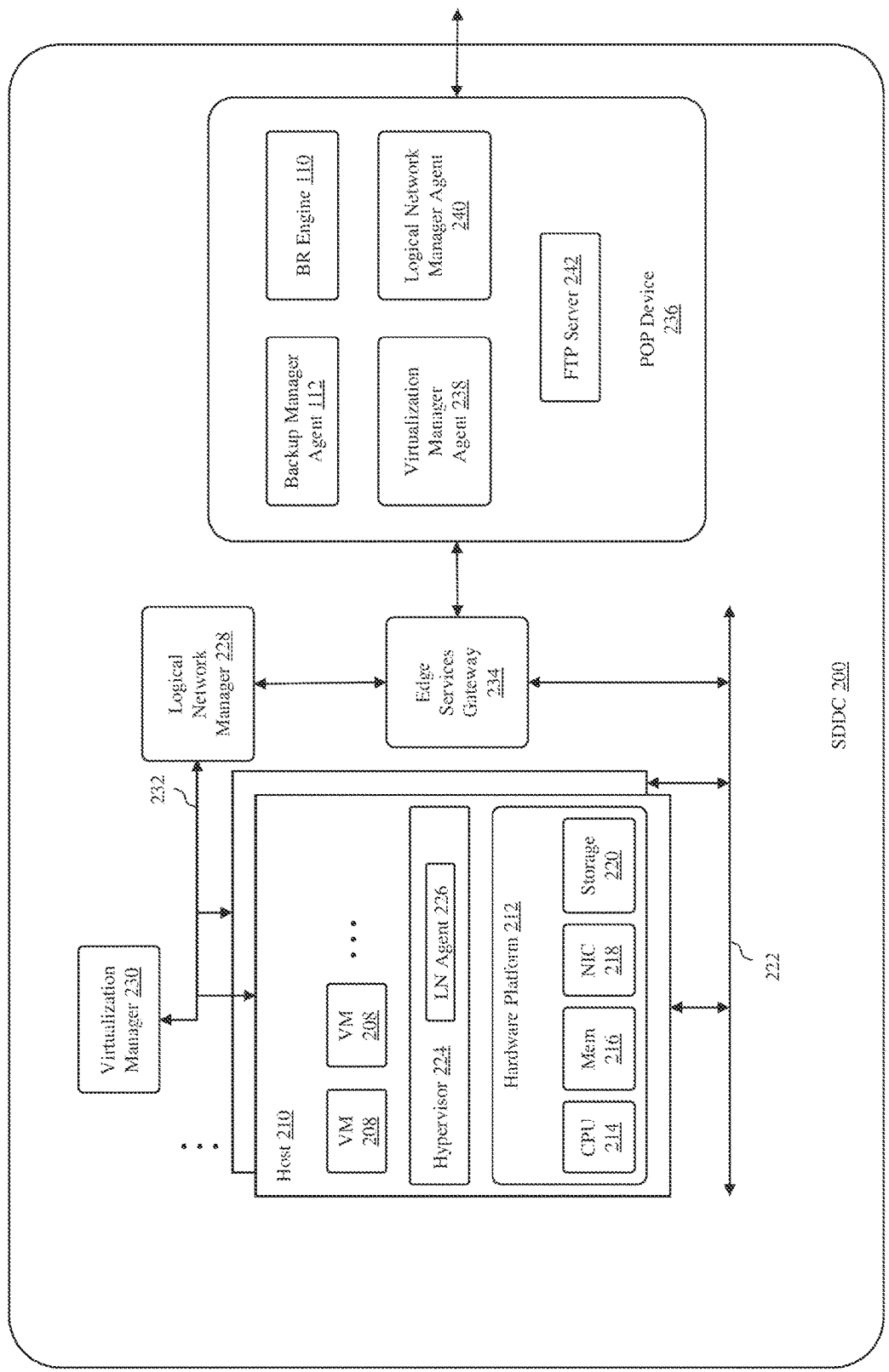
FIG. 2 is a diagram of an SDDC that can be deployed in the distributed computing system in accordance with an embodiment of the invention.

Turning now to FIG. 2, a representative SDDC 200 that can be deployed in the distributed computing system 100 in accordance with an embodiment of the invention is illustrated. Thus, the SDDC 200 is an example of the SDDCs 102 depicted in FIG. 1. As shown in FIG. 2, the SDDC 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, and storage 220. The processor 214 can be any type of a processor commonly used in servers. The memory 216 is volatile memory used for retrieving programs and processing data. The memory 216 may include, for example, one or more random access memory (RAM) modules. The network interface 218 enables the host 210 to communicate with other devices that are inside or outside of the SDDC 200 via a communication medium, such as a network 222. The network interface 218 may be one or more network adapters, also referred to as network interface cards (NICs). The storage 220 represents one or more local storage devices (e.g., one or more hard disks, flash memory modules, solid state disks and/or optical disks), which may be used to form a virtual storage area network (SAN).

Each host 210 may be configured to provide a virtualization layer that abstracts processor, memory, storage and networking resources of the hardware platform 212 into virtual computing instances, e.g., virtual machines 208, that run concurrently on the same host. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support "containers." In the following description, the virtual computing instances 208 will be described as being virtual machines.

In the illustrated embodiment, the hypervisor 224 includes a logical network (LN) agent 226, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the SDDC 200. The logical network agent 226 receives configuration information from a logical network manager 228 (which may include a control plane cluster) and, based on this information, populates forwarding, firewall and/or other action tables for dropping or directing packets between the virtual machines 208 in the host 210, other virtual machines on other hosts, and/or other devices outside of the SDDC 200. Collectively, the logical network agent 226, together with other logical network agents on other hosts, according to their forwarding/routing tables, implement isolated overlay networks that can connect arbitrarily selected virtual machines with each other. Each virtual machine may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 226 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The SDDC 200 also includes a virtualization manager 230 that communicates with the hosts 210 via a management network 232. In an embodiment, the virtualization manager 230 is a computer program that resides and executes in a computer system, such as one of the hosts, or in a virtual computing instance, such as one of the virtual machines 208 running on the hosts. One example of the virtualization manager 230 is the VMware vCenter Server® product made available from VMware, Inc. In an embodiment, the virtualization manager is configured to carry out administrative tasks for a cluster of hosts that forms an SDDC, including managing the hosts in the cluster, managing the virtual machines running within each host in the cluster, provisioning virtual machines, migrating virtual machines from one host to another host, and load balancing between the hosts in the cluster.

As noted above, the SDDC 200 also includes the logical network manager 228 (which may include a control plane cluster), which operates with the logical network agents 226 in the hosts 210 to manage and control logical overlay networks in the SDDC 200. Logical overlay networks comprise logical network devices and connections that are mapped to physical networking resources, e.g., switches and routers, in a manner analogous to the manner in which other physical resources as compute and storage are virtualized. In an embodiment, the logical network manager 228 has access to information regarding physical components and logical overlay network components in the SDDC. With the physical and logical overlay network information, the logical network manager 228 is able to map logical network configurations to the physical network components that convey, route, and filter physical traffic in the SDDC 200. In one particular implementation, the logical network manager 228 is a VMware NSX® product running on any computer, such as one of the hosts or a virtual machine in the SDDC 200.

The SDDC 200 also includes a gateway 234 to control network traffic into and out of the SDDC 200. In an embodiment, the gateway 234 may be implemented in one of the virtual machines 208 running in the SDDC 200. In a particular implementation, the gateway 234 may be an edge services gateway. One example of the edge services gateway 234 is VMware NSX® Edge™ product made available from VMware, Inc.

The SDDC 200 further includes a point-of-presence (POP) device 236, which acts as a bastion host to validate connections to various components in the SDDC 200, such as the logical network manager 228 and the virtualization manager 230. Thus, the POP device 236 ensures that only trusted connections are made to the various components in the SDDC 200.

In the illustrated embodiment, the POP device 236 includes the BR engine 110 and the backup manager agent 112. The POP device 236 further includes a virtualization manager agent 238 and a logical network manager agent 240. The virtualization manager agent 238 is configured or programmed to communicate with the virtualization manager 230 for backup operations. The virtualization manager agent 238 may also be configured or programmed to redeploy the virtualization manager 230 for restore operations. Similarly, the logical network manager agent 240 is configured or programmed to communicate with the logical network manager for backup operations, and redeploy the logical network manager 228 for restore operations.

The POP device 236 further includes a file transfer protocol (FTP) server 242, which is used to store and retrieve backup data, which is repeated generated for each backup operation in the SDDC 200 under the direction of the BR engine 110. In an embodiment, the backup data includes state and configuration data for the logical network manager 228 and the virtualization manager 230 that are needed to restore these components back to the time when the backup data was created.

Figure 3:
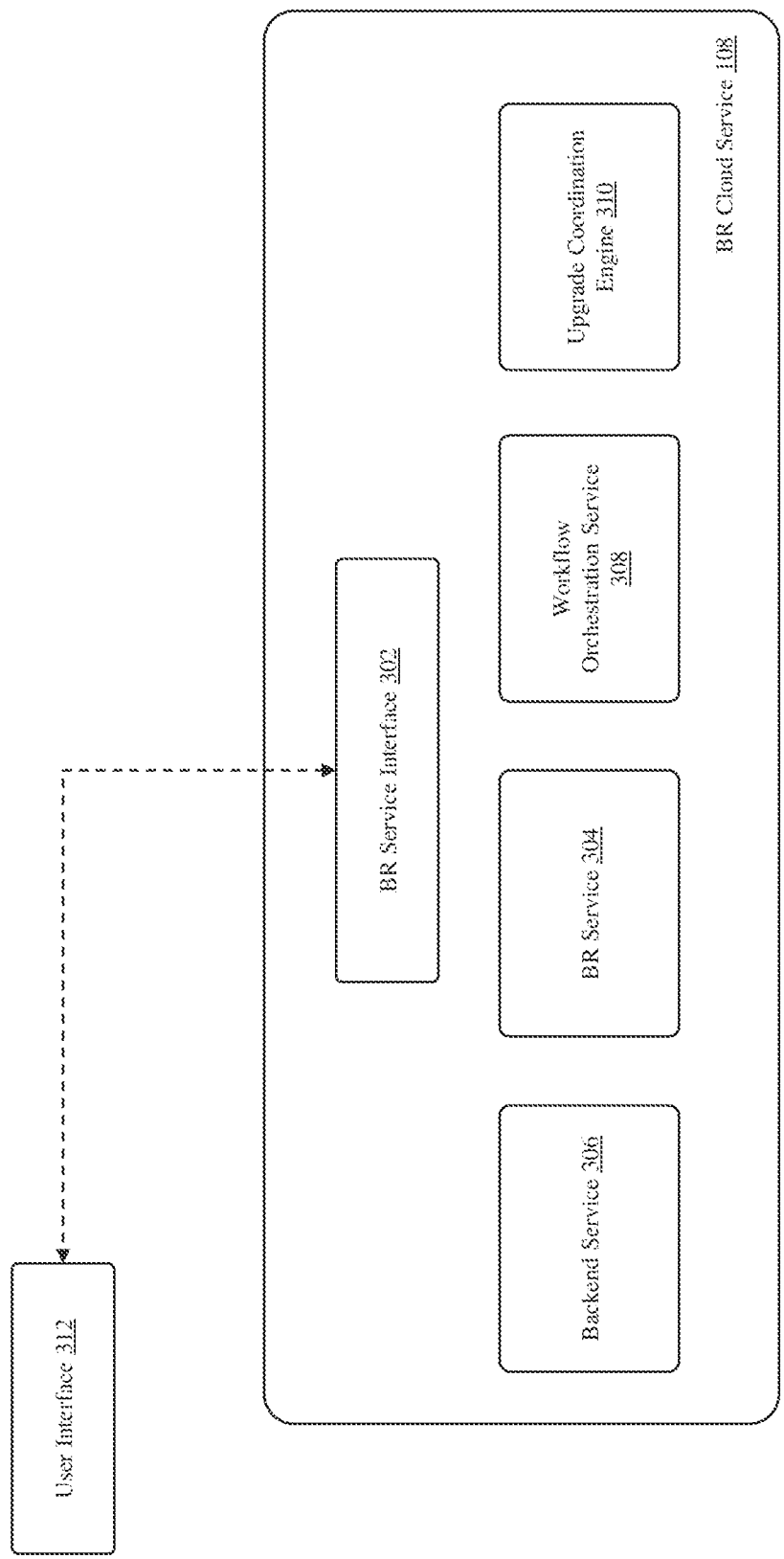
FIG. 3 show components of the BR cloud service in the distributed computing system in accordance with an embodiment of the invention.

Turning now to FIG. 3, components of the BR cloud service 108 in the cloud-based service 104 of the distributed computing system 100 in accordance with an embodiment of the invention are illustrated. As shown in FIG. 3, the BR cloud service 108 includes a backup-restore (BR) service interface 302, a backup-restore (BR) service 304, a backend service 306, a workflow orchestration service 308 and an upgrade coordination engine 310. The BR service interface 302 is configured to interface with a user interface (UI) 312, which can be used to access the BR cloud service 108 to initiate a backup or restore operation. In an embodiment, the UI 312 may be a web-based UI that can be used by a user, e.g., an administrator, to enter backup and restore commands for one or more SDDCs 102, which the user has the authority to access.

The BR service 304 is configured or programmed to manage backup and restore requests, which may be initiated by the user via the UI 312, as explained above. The backup operations may also be initiated by an upgrade coordination engine 310. which is configured or programmed to request a backup operation on an SDDC 102 when that SDDC is being upgraded so that the SDDC is backed up before the upgrade. In some embodiments, the upgrade coordination engine 310 may request a backup operation on an SDDC 102 for other operations that are handled by the cloud-based service 104. The BR service 304 is further configured or programmed to provide specific tasks for a backup or restore operation and to monitor the status of the tasks to ensure that all the tasks are properly completed. These specific backup and restore tasks may include, when the SDDC is scaled up and scaled out, rotating the passwords of the SDDC management components.

The backend service 306 is configured or programmed to maintain an inventory of components for each of the SDDCs 102. The inventory for an SDDC 102 may include a list of all the management components in the SDDC, as well as a list of all the processes or applications, such as VMs, running in the SDDC. Thus, the backend service 306 is able to provide the inventory of a particular SDDC 102 to the BR service 304 when needed for a backup or restore operation.

The workflow orchestration service 308 is configured or programmed to manage the workflow for a backup or restore operation. In particular, the workflow orchestration service 308 is configured to forward the specific tasks for a backup or restore operation to the BR engine 110 in a target SDDC 102, and also monitor the status of the tasks to ensure that all the tasks are properly completed.

In some embodiments, backup and restore operations for more than one of the SDDCs 102 may be orchestrated by the BR cloud service 108. Thus, backup and restore operations on the SDDCs 102 may be executed in parallel.

As noted above, a backup operation on an SDDC 102 in the distributed computing system 100 may be initiated by the backup manager agent 112 running in the POP device 236 of that SDDC. The backup manager agent 112 is configured or programmed with a set of backup rules that manages the backup lifecycles for the SDDC. These backup rules may include policies, patterns, and conditions data that specify when to trigger the backup operations, and backup retention policies. Each backup policy may contain the configuration for the backup trigger policy and its configuration data. Some examples of backup policies are:

1. An on-demand backup policy: This policy contains a list of system logs that are to be matched and their configuration data. This policy may define a maximum number of matched system logs for a system log pattern match and/or a minimum number of matched system logs for a system log pattern match. The policy may also define other parameters, such as whether to forcefully enable or disable the policy, the maximum backups that is allowed in this policy, whether the policy is alertable and whether the policy is enabled or not.
2. A default one backup policy: This policy is a scheduling policy that is set to trigger backup once every fixed interval, e.g., every 24 hours, which may be set as a cron job.
3. A default two backup policy: This policy is a scheduling policy that is set to trigger two times every fixed interval, e.g., every 24 hours, which may be set as a cron job.
4. A retention policy: This policy specifies the backup retention age, i.e., the length of time that backup data for each SDDC is to be retained. This policy may also define the number of backups per day.

In an embodiment, these backup rules for the backup manager agent 112 in each SDDC 102 are configured during the provisioning of the SDDC. The backup rules for an SDDC may be chosen by a user or an administrator of the SDDC, which may be stored in a data store or any storage that is accessible by the BR cloud service 108. An example of a backup rule schema for backup policies in accordance with an embodiment of the invention is illustrated in FIG. 4. The creation and use of these backup rules by the backup manager agent 112 in each SDDC 102 are now further described.

Figure 5A:
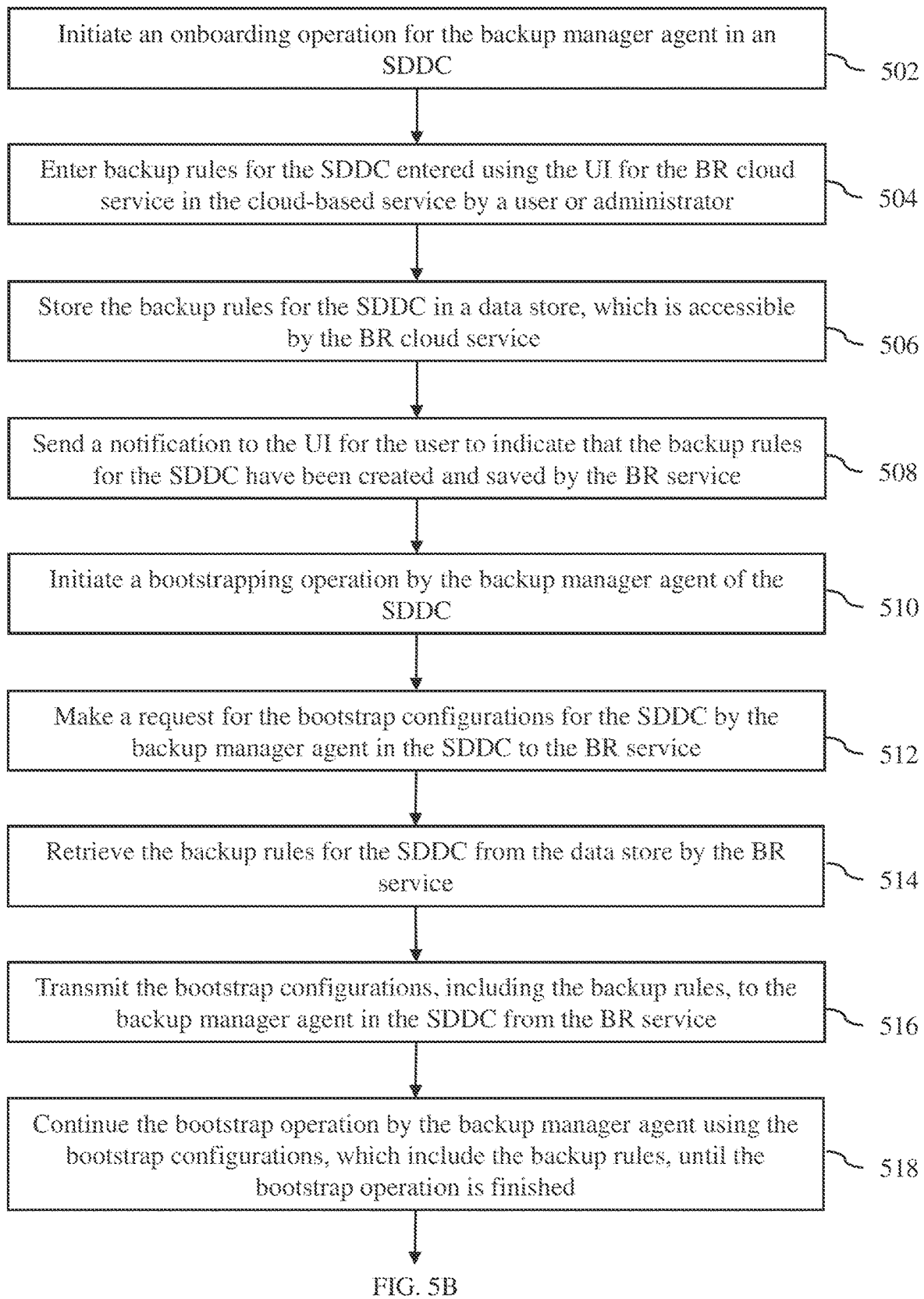
FIGS. 5A and 5B show a flow diagram of a process of creating and using backup rules by a backup manager agent in an SDDC in the distributed computing system in accordance with an embodiment of the invention.
Figure 5B:
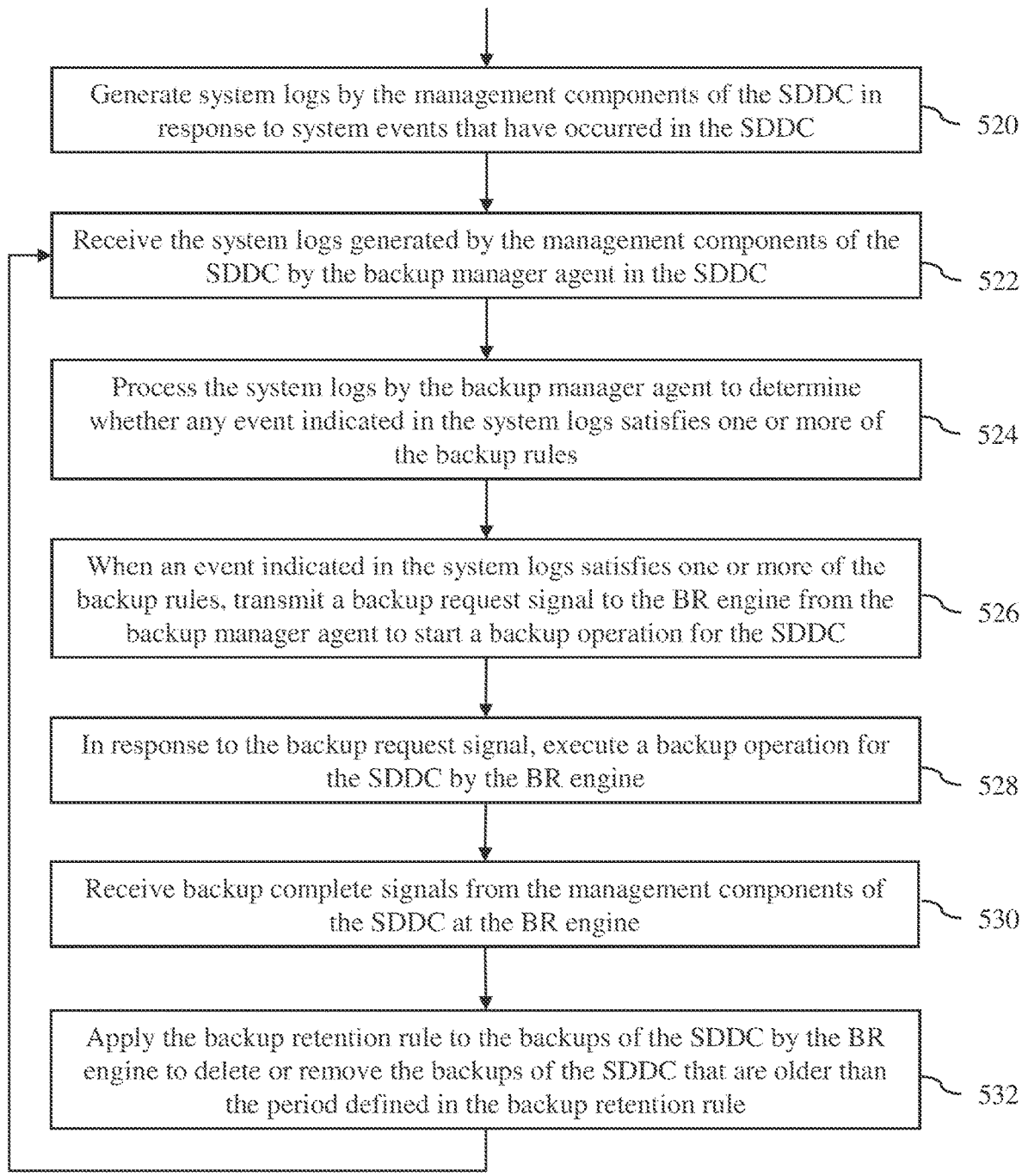

Turning now to FIGS. 5A and 5B, a flow diagram of a process of creating and using backup rules by the backup manager agent 112 in an SDDC 102 in the distributed computing system 100 in accordance with an embodiment of the invention is shown. The process begins at step 502, where an onboarding operation for the backup manager agent 112 in the SDDC 102 is initiated. In an embodiment, this onboarding operation is executed as part of the provisioning process of the SDDC 102 when the SDDC is deployed or created by the cloud-based service 104.

Next, at step 504, backup rules for the SDDC 102 are entered using the UI 312 for the BR cloud service 108 in the cloud-based service 104 by a user or administrator. As noted above, the backup rules may include, but not limited to, policies, patterns, conditions data or any data that specify when to trigger a backup operation, and backup retention policies.

Next, at step 506, the backup rules for the SDDC 102 are stored in a data store, which is accessible by the BR cloud service 108. In an embodiment, the backup rules for the SDDC 102 are stored by the BR service 304 in the data store. As described below, the stored backup rules will be used by the backup manager agent 112 to trigger or initiate a backup operation when one or more of the backup rules are satisfied.

Next, at step 508, once the backup rules for the SDDC 102 are properly stored, a notification is sent to the UI 312 for the user to indicate that the backup rules for the SDDC have been created and saved by the BR service 304. The onboarding operation for the SDDC is now complete.

Next, at step 510, a bootstrapping operation is initiated by the backup manager agent 112 of the SDDC 102. This step follows the onboarding operations.

At step 512, a request for the bootstrap configurations for the SDDC 102 is made by the backup manager agent 112 in the SDDC to the BR service 304. The bootstrap configurations include the backup rules, as well as other configurations for the backup agent, such as SDDC inventory details (e.g., VMware vCenter Server® and VMware NSX® components), the additional SDDC add-ons (e.g., VMware HCX™ and VMware Site Recovery Manager™ components) that are enabled for the SDDC.

Next, at step 514, in response to the request for the bootstrap configurations for the SDDC 102, the backup rules for the SDDC are retrieved from the data store by the BR service 304.

Next, at step 516, the bootstrap configurations, including the backup rules, are transmitted to the backup manager agent 112 in the SDDC 102 from the BR service 304.

Next, at step 518, the bootstrap operation is continued by the backup manager agent 112 using the bootstrap configurations, which include the backup rules, until the bootstrap operation is finished. After the bootstrap operation is complete, the backup manager agent 112 in the SDDC 102 monitors the SDDC to determine when a backup operation needs to be initiated.

Next, step 520, system logs are generated by the management components of the SDDC 102, such as the logical network manager 228 and the virtualization manager 230, in response to system events that have occurred in the SDDC. These system events include changes to software components running in the SDDC, such as addition and deletion of VMs. The system events may also include configuration changes to one or more management components of the SDDC, such as policy or setting changes in the logical network manager and/or the virtualization manager.

Next, at step 522, the system logs generated by the management components of the SDDC 102 are received by the backup manager agent 112 in the SDDC. In an embodiment, the system logs may be periodically pulled from the management components of the SDDC by the backup manager agent using, for example, APIs. In other embodiments, the system logs may be periodically pushed to the backup manager agent by the management components of the SDDC.

At step 524, after the system logs are received, the system logs are processed by the backup manager agent 112 to determine whether any event indicated in the system logs satisfies one or more of the backup rules. In an embodiment, the system logs are compared to the backup rules for the SDDC to determine whether any of the system logs match the backup rules. Depending on the backup rules, a single system log match or multiple system log matches may be needed for the backup manager agent 112 to initiate a backup operation.

At step 526, when an event indicated in the system logs satisfies one or more of the backup rules, a backup request signal is transmitted to the BR engine 110 from the backup manager agent 112 in the same SDDC to start a backup operation for the SDDC. In an embodiment, the backup operation may include only creating backup data for the management components of the SDDC, such as the logical network manager 228 and the virtualization manager 230. In this embodiment, the BR engine 110 in the SDDC directly executes the backup operation on the SDDC. In an alternative embodiment, the backup request signal may be transmitted to the BR service 304 in the BR cloud service 108 so that the backup operation on the SDDC is orchestrated by the BR service and executed by the BR engine 110 in the SDDC.

Next, at step 528, in response to the backup request signal, a backup operation for the SDDC 102 is executed by the BR engine 110 in that SDDC. The backup operation executed by the BR engine 110 is described below.

Next, at step 530, as the backup operation is being completed for each of the management components of the SDDC 102, backup complete signals from the management components of the SDDC are received at the BR engine 110. When the complete signals from all the management components of the SDDC are received by the BR engine, this indicates that the backup operation for the SDDC has been successfully completed.

Next, at step 532, the backup retention rule is applied to the backups of the SDDC 102, e.g., the backup data for the management components of the SDDC, by the BR engine 110 to delete or remove the backups of the SDDC that are older than the period defined in the backup retention rule. For example, if the period defined in the backup retention rule is twenty-eight (28) days, the backups of the SDDC that are older than twenty-eight (28) days will be deleted by the BR engine. The process then proceeds back to step 522 to continue monitoring the SDDC to initiate another backup operation for the SDDC when one or more backup rules are satisfied.

In some embodiments, the backup manager agent 112 may tag each backup operation with the corresponding backup policy or rule that triggered the backup operation. These tags can then be used in the backup retention and/or audition operations.

Figure 6:
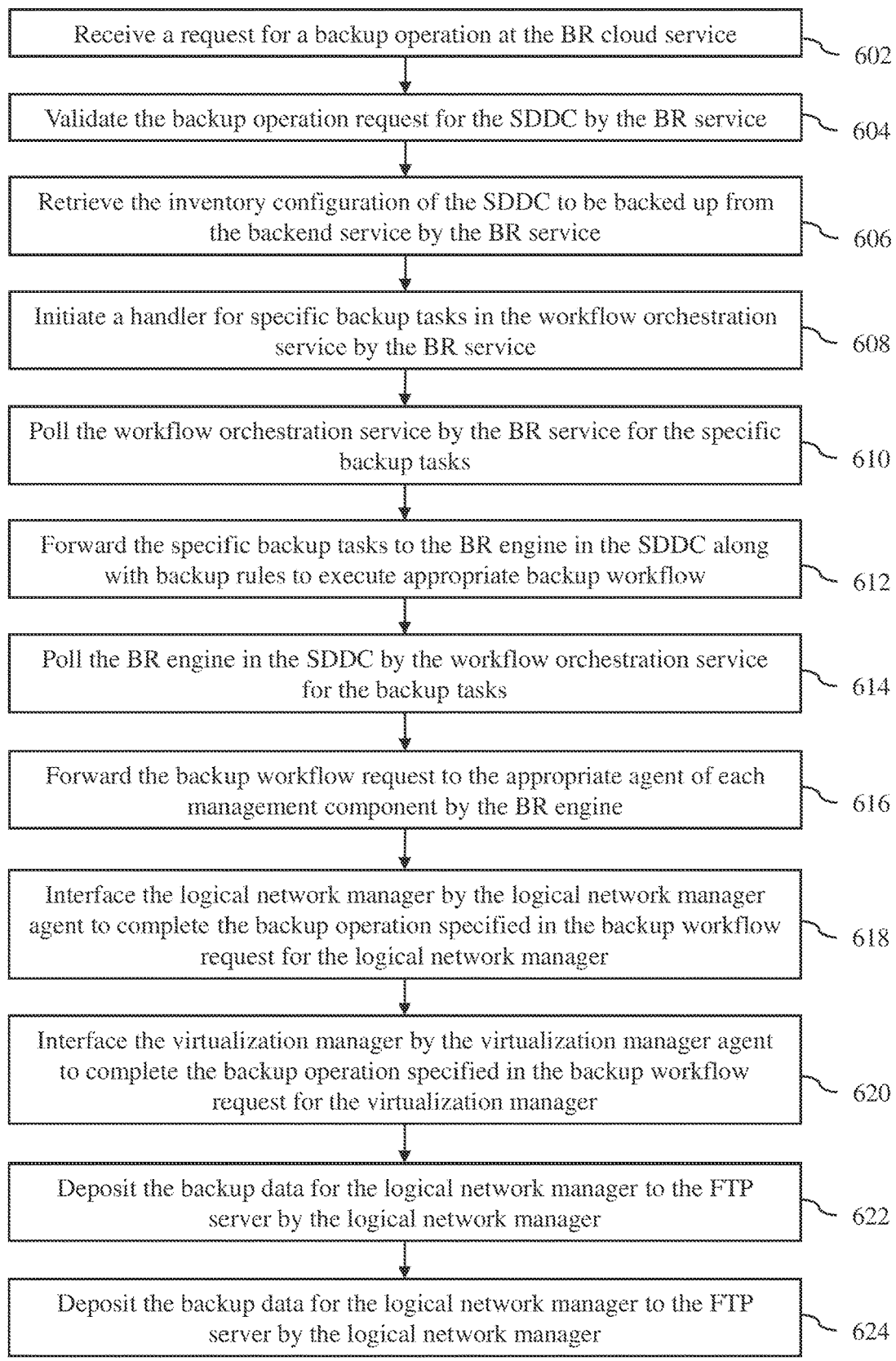
FIG. 6 is a flow diagram of a backup operation on an SDDC in the distributed computing system in accordance with an embodiment of the invention.

A backup operation on an SDDC 102 in the distributed computing system 100 in accordance with an embodiment of the invention is described with reference to a process flow diagram of FIG. 6. The backup operation begins at step 602, where a request for a backup operation is received at the BR cloud service 108. The backup operation request may be from the UI 312 or from the update coordination engine 310. If the backup operation request is from the UI 312, the request is forwarded to the BR service 304 by the BR service interface 302. Alternatively, the backup operation request may be from the backup manager agent 112 in the SDDC 102 when one or more system logs from the management components in the SDDC satisfy one or more backup rules.

Next, at step 604, the backup operation request for the SDDC 102 is validated by the BR service 304. Next, at step 606, the inventory configuration of the SDDC to be backed up is retrieved from the backend service 306 by the BR service 304. The inventory configuration includes all the components deployed as part of the SDDC.

Next, at step 608, a handler for specific backup tasks is initiated in the workflow orchestration service 308 by the BR service 304. Next, at step 610, the workflow orchestration service 308 is polled by the BR service 304 for the specific backup tasks.

Next, at step 612, the specific backup tasks are forwarded to the BR engine 110 in the SDDC 102 along with backup rules to execute appropriate backup workflow. Next, at step 614, the BR engine 110 in the SDDC 102 is polled by the workflow orchestration service 308 for the backup tasks.

Next, at step 616, the backup workflow request is forwarded to the appropriate agent of each management component, e.g., the logical network manager agent 240 and the virtualization manager agent 238, by the BR engine 110. In response to the backup workflow request, each agent interfaces with the corresponding management component to complete the backup operation specified in the backup workflow request for the management component. Thus, the logical network manager 228 is interfaced by the logical network manager agent 240 to complete the backup operation specified in the backup workflow request for the logical network manager, at step 618. Similarly, the virtualization manager 230 is interfaced by the virtualization manager agent 238 to complete the backup operation specified in the backup workflow request for the virtualization manager, at step 620.

Next, at step 622, the backup data for the logical network manager is deposited to the FTP server 242 by the logical network manager. Similarly, at step 624, the backup data for the virtualization manager 230 is deposited to the FTP server 242 by the virtualization manager. The backup data may be used to restore the logical network manager and/or the virtualization manager when needed.

Figure 7:
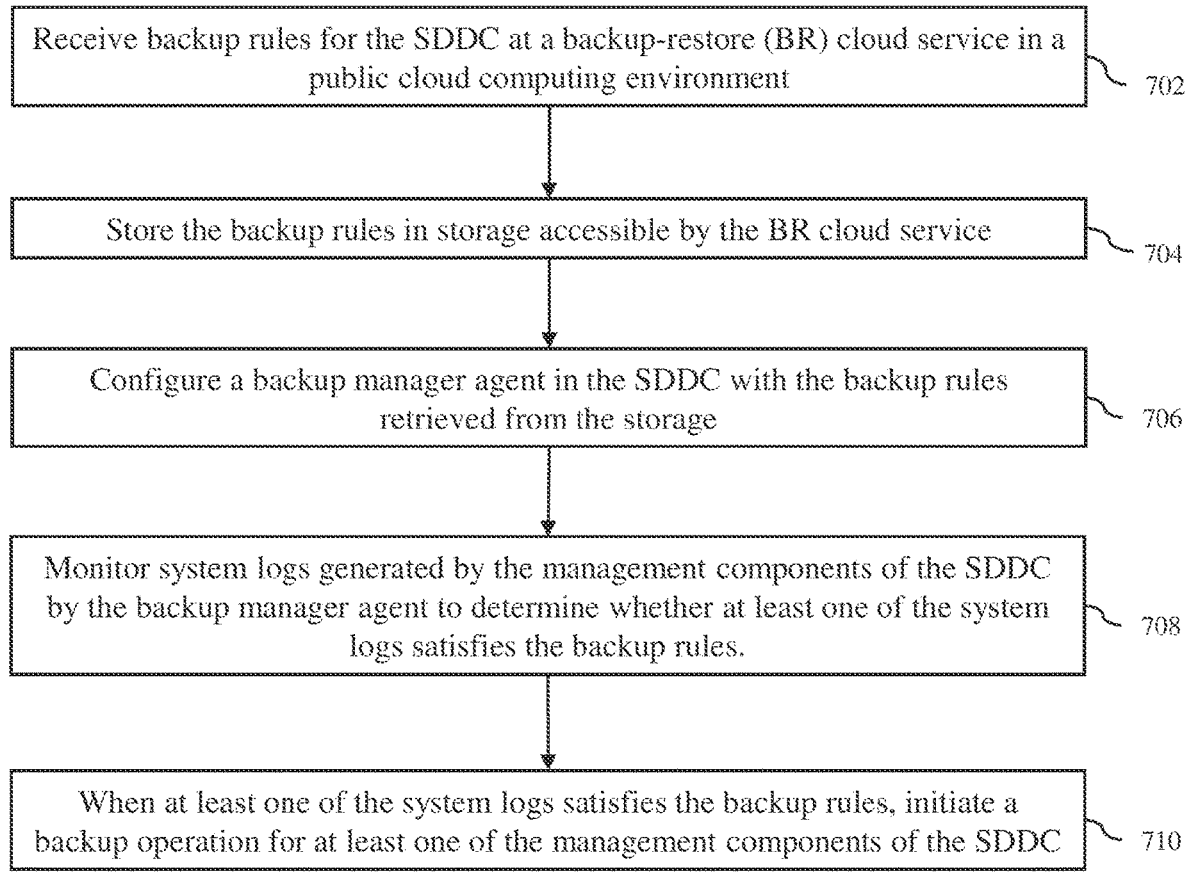
FIG. 7 is a flow diagram of a computer-implemented method for backing up management components of an SDDC managed by a cloud-based service in accordance with an embodiment of the invention.

A computer-implemented method for backing up management components of a software-defined data center (SDDC) managed by a cloud-based service in accordance with an embodiment of the invention is described with reference to a flow diagram of FIG. 7. At block 702, backup rules for the SDDC are received at a backup-restore (BR) cloud service in a public cloud computing environment. At block 704, the backup rules are stored in storage accessible by the BR cloud service. At block 706, a backup manager agent in the SDDC is configured with the backup rules retrieved from the storage. At block 708, system logs generated by the management components of the SDDC are monitored by the backup manager agent to determine whether at least one of the system logs satisfies the backup rules. At block 710, when at least one of the system logs satisfies the backup rules, a backup operation is initiated for at least one of the management components of the SDDC.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for backing up management components of a software-defined data center (SDDC) managed by a cloud-based service, the method comprising:
receiving backup rules for the SDDC at a backup-restore (BR) cloud service in a public cloud computing environment;
storing the backup rules in storage accessible by the BR cloud service;
configuring a backup manager agent in the SDDC with the backup rules retrieved from the storage;
monitoring system logs generated by the management components of the SDDC by the backup manager agent to determine whether at least one of the system logs satisfies the backup rules; and
when at least one of the system logs satisfies the backup rules, initiating a backup operation for at least one of the management components of the SDDC.

2. The computer-implemented method of claim 1, further comprising comparing the system logs to the backup rules to find matches to determine whether at least one of the system logs satisfies the backup rules.

3. The computer-implemented method of claim 1, further comprising applying a backup retention rule to backups of the SDDC to remove the backups of the SDDC that are older than a period defined in the backup retention rule.

4. The computer-implemented method of claim 1, wherein the backup manager agent is in a point-of-presence (POP) device in the SDDC.

5. The computer-implemented method of claim 4, wherein the backup operation for at least one of the management components of the SDDC is executed by a backup engine in the POP device in the SDDC.

6. The computer-implemented method of claim 1, wherein receiving the backup rules for the SDDC and storing the backup rules are performed during an onboarding process when the SDDC is deployed.

7. The computer-implemented method of claim 1, wherein configuring the backup manager agent in the SDDC is performed during a bootstrapping process of the backup manager agent.

8. The computer-implemented method of claim 1, wherein the system logs generated by the management components of the SDDC include system logs from a virtualization manager or a logical network manager in the SDDC.

9. A non-transitory computer-readable storage medium containing program instructions for backing up management components of a software-defined data center (SDDC) managed by a cloud-based service, wherein execution of the program instructions by one or more processors of a computer system causes the one or more processors to perform steps comprising:
receiving backup rules for the SDDC at a backup-restore (BR) cloud service in a public cloud computing environment;
storing the backup rules in storage accessible by the BR cloud service;
configuring a backup manager agent in the SDDC with the backup rules retrieved from the storage;
monitoring system logs generated by the management components of the SDDC by the backup manager agent to determine whether at least one of the system logs satisfies the backup rules; and
when at least one of the system logs satisfies the backup rules, initiating a backup operation for at least one of the management components of the SDDC.

10. The computer-readable storage medium of claim 9, wherein the steps further comprise comparing the system logs to the backup rules to find matches to determine whether at least one of the system logs satisfies the backup rules.

11. The computer-readable storage medium of claim 9, wherein the steps further comprise applying a backup retention rule to backups of the SDDC to remove the backups of the SDDC that are older than a period defined in the backup retention rule.

12. The computer-readable storage medium of claim 9, wherein the backup manager agent is in a point-of-presence (POP) device in the SDDC.

13. The computer-readable storage medium of claim 12, wherein the backup operation for at least one of the management components of the SDDC is executed by a backup engine in the POP device in the SDDC.

14. The computer-readable storage medium of claim 9, wherein receiving the backup rules for the SDDC and storing the backup rules are performed during an onboarding process when the SDDC is deployed.

15. The computer-readable storage medium of claim 9, wherein configuring the backup manager agent in the SDDC is performed during a bootstrapping process of the backup manager agent.

16. The computer-readable storage medium of claim 9, wherein the system logs generated by the management components of the SDDC include system logs from a virtualization manager or a logical network manager in the SDDC.

17. A computer system comprising:
memory; and
at least one processor configured to:
receive backup rules for SDDC a software-defined data center (SDDC) at a backup-restore (BR) cloud service in a public cloud computing environment;
store the backup rules in storage accessible by the BR cloud service;
configure a backup manager agent in the SDDC with the backup rules retrieved from the storage;
monitor system logs generated by the management components of the SDDC by the backup manager agent to determine whether at least one of the system logs satisfies the backup rules; and
when at least one of the system logs satisfies the backup rules, initiate a backup operation for at least one of the management components of the SDDC.

18. The computer system of claim 17, wherein the at least one process is configured to compare the system logs to the backup rules to find matches to determine whether at least one of the system logs satisfies the backup rules.

19. The computer system of claim 17, wherein the at least one process is configured to apply a backup retention rule to backups of the SDDC to remove the backups of the SDDC that are older than a period defined in the backup retention rule.

20. The computer system of claim 17, wherein the backup manager agent is in a point-of-presence (POP) device in the SDDC.

* * * * *